May 31, 1927.

A. B. FOWLER 1,630,562

MACHINE FOR USE IN THE MANUFACTURE OF BOOTS AND SHOES

Original Filed Jan. 21, 1926   7 Sheets-Sheet 1

Fig.1.

INVENTOR.
Alfred B. Fowler
By his Attorney,
Nelson W. Howard

A. B. FOWLER

MACHINE FOR USE IN THE MANUFACTURE OF BOOTS AND SHOES

Original Filed Jan. 21, 1926    7 Sheets-Sheet 4

INVENTOR
Alfred B. Fowler
By his Attorney
Nelson W. Howard

Patented May 31, 1927.

1,630,562

UNITED STATES PATENT OFFICE.

ALFRED B. FOWLER, OF BEVERLY, MASSACHUSETTS, ASSIGNOR TO UNITED SHOE MACHINERY CORPORATION, OF PATERSON, NEW JERSEY, A CORPORATION OF NEW JERSEY.

MACHINE FOR USE IN THE MANUFACTURE OF BOOTS AND SHOES.

Original application filed December 4, 1918, Serial No. 265,245. Divided and this application filed January 21, 1926, Serial No. 82,710. Renewed March 5, 1927.

This invention relates to machines for use in the manufacture of boots and shoes, and is herein illustrated as embodied in a multi-station machine for performing operations on the heels of boots and shoes of the type disclosed in my co-pending application Serial No. 265,245, filed December 4, 1918, of which this application is a division.

Machines of the type referred to are each provided with a movable carrier having thereon a plurality of shoe supports and arranged to transfer shoes from a loading station to one or more treating stations, and thence to a discharge station. It is an object of the present invention to provide improved work-supporting and transferring mechanism adapted for use in machines of the type referred to, although in various aspects the invention is not limited to embodiment in such machines.

To this end, in accordance with a feature of the invention, means are provided for starting and controlling the movement of a carrier illustrated as of the type referred to, which means are arranged to be controlled by shoe jacking means so that improper operation of the carrier is prevented and the operator is relieved from the danger of a premature starting of the carrier before the jacking operation has been completed. Improper operation of the jacking means is prevented also, in accordance with another feature of the invention, by locking means arranged to prevent actuation of the jacking means until a shoe support reaches jacking position.

In accordance with other features of the invention, novel shoe-supporting and clamping mechanism is provided comprising, in the illustrated embodiment of the invention, a stop member and an associated sliding plunger arranged to clamp a shoe therebetween. As illustrated, an operator-controlled lever is provided for applying powerful pressure to the plunger, and the shoe may be automatically held in clamped position under any desired degree of pressure, while it is transferred by the carrier from the point of pressure application to a point of release, by means of a one-way clutch device co-operating with the plunger to hold it in its clamping position. Where a plurality of shoe supports of this sort are mounted upon a carrier, a single operator-controlled treadle may be provided at the loading station arranged to co-operate with any one of the plungers of the clamping devices.

In accordance with other features of the invention, novel mechanism is provided arranged automatically to unjack the shoe after the work has been carried past the various treating stations and the work of the machine completed. In the illustrated embodiment of the invention, where the transfer mechanism takes the form of an endless carrier, the automatic unjacking means operates as the shoe approaches the jacking station, and the removal of the unjacked shoe is facilitated by providing novel means for tilting a hinged portion of the sliding plunger which supports the work forwardly toward the operator after it has been unclamped. In the reverse operation of jacking a shoe, novel means are provided for holding the hinged portion in operative position.

Still another feature of the invention consists in the provision in a multi-station machine provided with a movable carrier of novel mechanism arranged so that the operator may unjack a shoe at will at any position of the carrier.

These and other features of the invention will best be understood from a consideration of the following specification taken in connection with the accompanying drawings in which.

The illustrated machine comprises an endless carrier upon which are supported a plurality of work-clamping shoe supports and a plurality of tools arranged adjacent to but outside of the carrier in position so that they may be utilized to treat the individual pieces of work which are presented to them by the carrier. These tools, which may take a variety of forms, are arranged, in the present machine, to trim the outer surface of a heel from one breast corner to the other, to finish the rand of the shoe and to scour the outer surface of the heel after treatment by the trimming tool, but it will be understood that a variety of other combinations of tools may well be substituted for use with the particular form of work support and carrier mechanism herein claimed. The tools, regardless of their particular character, are preferably rotated or operated continuously and means are provided for periodically moving the carrier to present the heels of shoes supported upon the carrier successively to the various tools and then automatically to suspend movement of the carrier and to actuate the shoes while in operative relation with the tools so that various parts of the heel surface are presented to the tools for treatment. When the respective shoes have been treated by the tools, the carrier is automatically moved to advance them to the next station and to return the finished shoe to a discharge station where it is automatically unjacked and presented for removal and replacement by another piece of work.

The illustrated machine is built upon a base 16 and is provided with a plurality of tool-supporting standards 18. A drive shaft is provided, which is not shown, and power supplied from this drive shaft may conveniently be controlled by means of a lever 20 which, if the transfer of power is by means of belts such as that indicated at 22 in Fig. 4, will take the form of a belt-shifting arrangement. The various tools are mounted upon rotating spindles 24 which are supported in bearings carried by slides 26 that move back and forth across the tops of the standards 18. Each of the tools is surrounded by a casing 28 and suction pipes 30 connected to these casings for the removal of dust or waste material.

Figure 3:
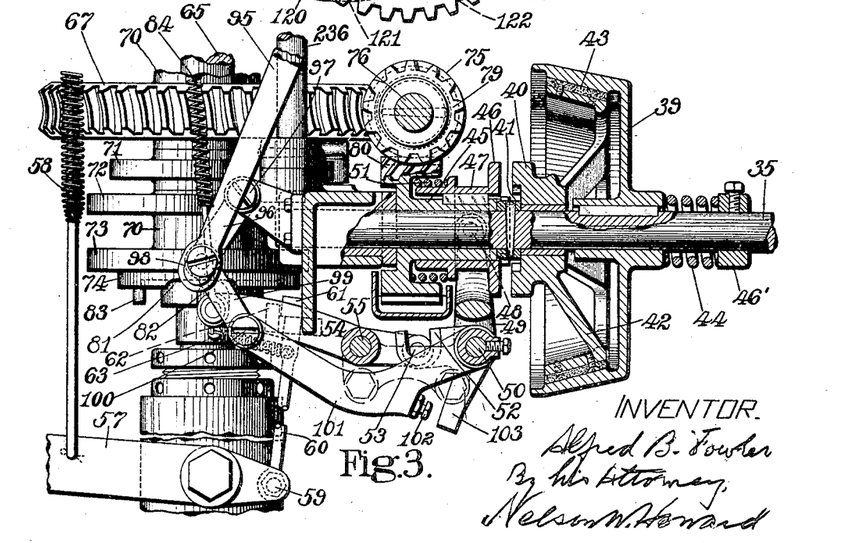
Fig. 3 is a side elevation, with parts broken away and in section, of this same mechanism.

The motion of the drive shaft is imparted to the mechanism for controlling the table or carrier and the jacks or work supports through an intermediate shaft 35, Fig. 3, mounted in appropriate bearings and having mounted thereon a worm wheel in operative engagement with a worm on the drive shaft, the construction being such that so long as the drive shaft is actuated the intermediate shaft 35 will also be actuated.

Figure 2:
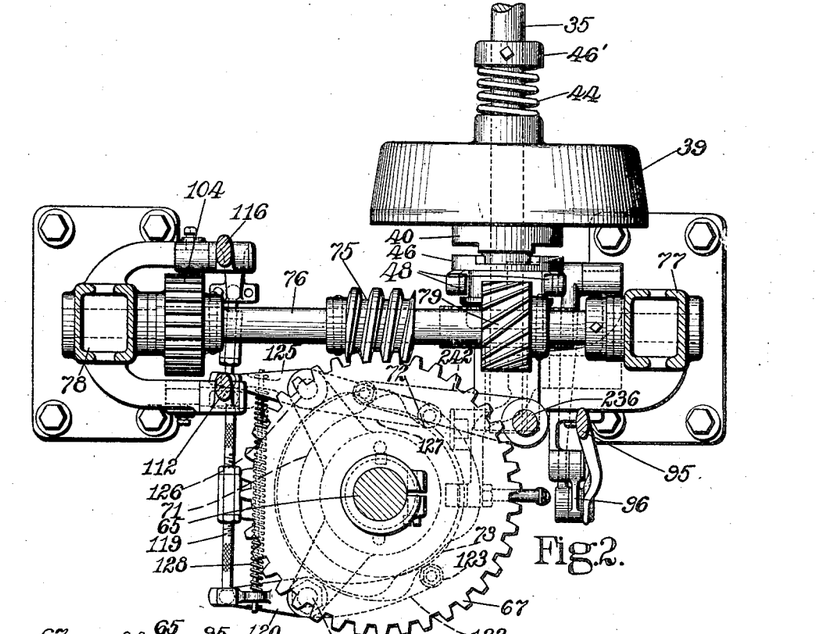
Fig. 2 is a section on the line 2—2 of Fig. 4 showing in plan view, on an enlarged scale, part of the clutch mechanism.

The shaft 35, see Figs. 2 and 3, has splined thereto one member 39 of a clutch, the other member 40 of which is loosely mounted on the shaft. Secured to the shaft 35, Fig. 3, is a collar 41 against which the hub portion of the loose member 40 of the clutch bears. Extending from the loose member 40 of the clutch are the arms 42 carrying suitable friction material 43, and a spring 44 on the shaft 35 is interposed between a collar 46' secured to the shaft and the hub of the clutch member 39, the construction being such that the two clutch members will, under the stress of the spring 44, be normally held in operative relation and will, perforce, rotate together, but should any unusual obstruction occur to retard the member 40 of the clutch the two clutch members may yield or slip.

Loosely mounted on the shaft 35, Fig. 3, is a sleeve 45 on which is splined a clutch member 46 having a circular recess 47 engaged by pins or rolls 48 on the bifurcated end portions of an arm 49 pivoted at 50. The clutch member 46 is normally under the influence of a spring 51 tending to move said clutch member 46 into clutching engagement with the clutch member 40, said clutch members having complemental projecting and recessed portions for positive engagement, as indicated in Fig. 2.

The clutch controlling arm 49 has a recessed extension 52 which is engaged by a pin 53 mounted on the lever 54 pivoted at 55, the construction being such that should the lever 54 be turned clockwise, to the position shown in Fig. 3, the clutch member 46 will be moved to the left, as shown, and be disengaged from the clutch member 40, but should the lever 54 be moved contraclockwise, Fig. 3, the pin 53 will rise and permit the spring 51 to engage the clutch members 46 and 40. The clutch member 46, as heretofore explained, is splined to the sleeve 45 and when the clutch members are operatively engaged the sleeve 45 will be turned. Trains of mechanism are connected to the sleeve 45 and control the movements of the several parts of the machine including the work supports and controlling cams as will more fully appear.

Figure 1:
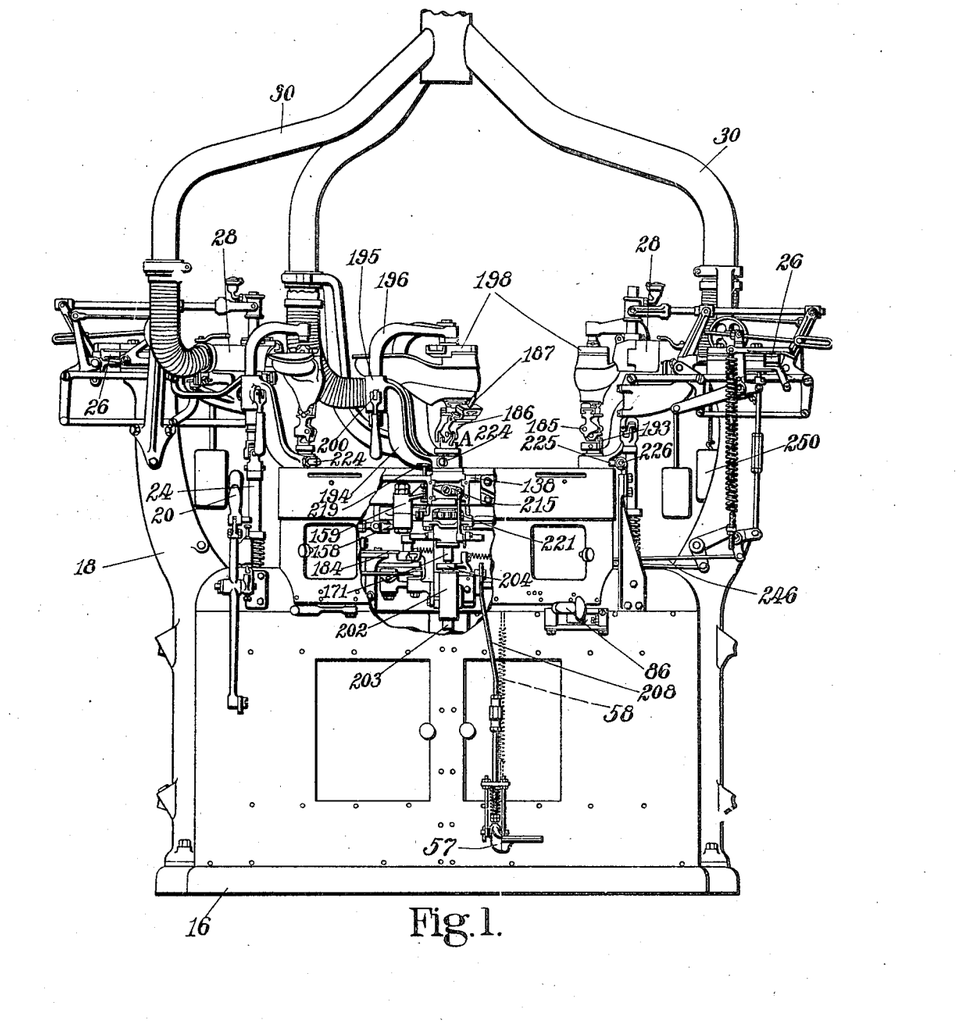
Fig. 1 is a front elevation of the machine, part of the casing being broken away.
Figure 4:
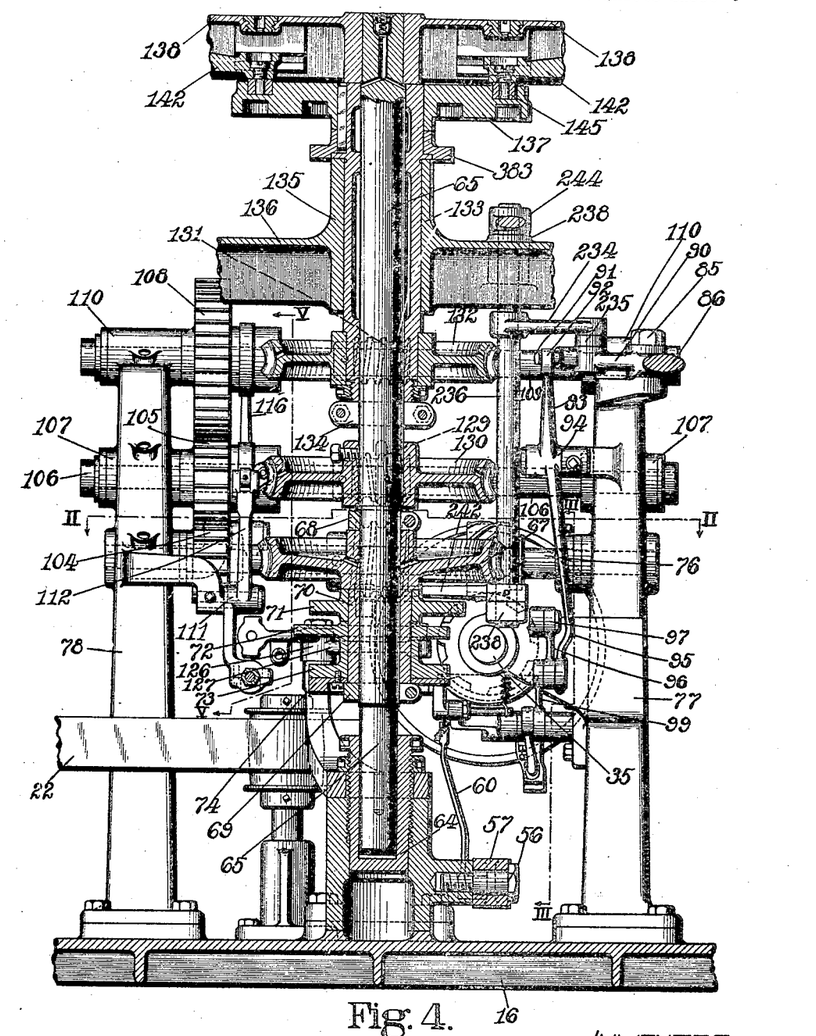
Fig. 4 is a transverse sectional elevation showing more particularly the means for automatically controlling the carrier, the jack-operating mechanism and the clutch.

Pivotally mounted at 56, Figs. 3 and 4, is a jacking treadle 57, the foot engaging end of which is normally held elevated by a spring 58, Figs. 1 and 3. Connected to the jacking treadle 57 at 59, Fig. 3, is an arm 60 the upper end portion of which carries a catch 61 adapted at times, as will presently appear, to engage a lug or projection 62 mounted on the clutch shifting lever 54. A spring 63 normally tends to engage the catch 61 with the lug 62, the construction being such that with the parts in position as indicated in Fig. 3 should the jacking treadle 57 be depressed the catch 61 will be lifted to carry its shoulder above the lug 62, whereupon the spring 63 will engage the catch with the shoulder and, upon release of the jacking treadle 57, the arm 60 will be pulled downwardly thereby to turn the lever 54 contraclockwise and permit engagement of the clutch members 40 and 46 to start the machine.

Mounted in a suitable step bearing 64 on the machine base 1, Fig. 4, is the table spindle or shaft 65 to the upper end portion of which is secured the table or carrier, the characteristics of which will be more fully described.

The spindle or shaft 65 has loosely mounted thereon the worm wheel 67, Figs. 2, 3 and 4, which is confined between suitable collars 68 and 69 secured to the spindle or shaft 65. The hub 70 of the worm wheel 67 is elongated as indicated in Figs. 3 and 4 and has secured thereto a series of cams 71, 72, 73 and 74 for controlling the operative or inoperative condition of parts as will more fully appear.

The worm wheel 67 is operatively engaged with a worm 75, Figs. 2 and 3, secured to a transverse shaft 76 rotatably mounted in suitable bearings formed in the risers 77 and 78 projecting upwardly from the machine base, substantially as indicated in Fig. 4. The shaft 76 is driven from the clutch member 46 through an appropriate train of connecting mechanism which, in the present instance of the invention, comprises a worm wheel 79, Figs. 2 and 3, operatively engaged with a worm 80 formed as part of or secured to the sleeve 45, the construction being such that when the clutch members 40 and 46 are engaged the worm wheel 67 and its connected hub 70 carrying the cams 71, 72, 73 and 74 will be continuously rotated.

When the clutch members 40 and 46 have been operatively engaged by contraclockwise movement of the lever 54 in the manner hereinbefore described, it is desirable that such lever be maintained in position with the clutch members engaged to maintain the series of cams 71, 72 and 73 in operative control of the table, the jacks or work supports thereon, and tools, as will more fully appear, until the tools have completed their respective operations upon the heels of the shoes presented thereto and a finished shoe has reached the jacking station, and that then the parts be controlled so as to prevent further operation until the finished shoe is removed and another jacked at the jacking station. To this end the hub 70, Fig. 3, carries the cam 74 which may be appropriately formed on the face of the cam 73 and the cam 74 has a depressed portion 81. The lever 54 carries a projection or rider 82 over which the cam 74 travels, the construction being such that when the lever 54 is turned contraclockwise in the manner hereinbefore described, and the cam 74 is turned through the means stated, the projection or rider 82 will travel along the face of the cam and hold the lever 54 in position with the machine in operation. Projecting from the face of the cam 74 is a pin 83, Fig. 3, which, as the cam 74 rotates, is adapted to engage the catch 61 on the arm 60 and disengage the catch from the lug 62, so that after the projection or rider 82 has engaged the high part of the cam 74, the lever 54 is freed from control of the jacking lever 57 and will remain with the clutch members 40 and 46 in engaged relation until, in the rotation of the cam 74, the depressed portion 81 thereof comes opposite the projection or rider 82, whereupon, the lever 54, under the impulse of a spring 84, Fig. 3, will be turned clockwise, to disengage the clutch members 40 and 46 and stop operative movement of the machine.

In addition to the means described for controlling the engagement and disengagement of the clutch members 40 and 46, other means are provided operable to stop the machine at the will of the attendant, as will now be described.

Pivotally mounted at 85, Fig. 4, is an emergency lever 86 (Fig. 1) which extends to the front of the machine near the jacking station in convenient reach of the attendant. The emergency lever 86 has a locking pin and a hand control grip whereby the emergency lever may be moved about its pivot 85 and held in desired position by suitable locking recesses formed in a portion of the machine frame. The emergency lever 86 has a projecting arm 90, Fig. 4, which terminates in a pin 91 engaged with the bifurcated end 92 of a lever 93 pivoted at 94 on a bracket or lug secured to or formed as part of the riser 77.

The lever 93 has a downwardly projecting arm 95, Figs. 3 and 4, the lower end portion of which is connected to a toggle for controlling the clutch member 46. In the present exemplification of the invention the toggle comprises the link 96 pivoted to a bracket at 97 fixed to the machine frame and connected at its other end at 98 to the other toggle member 99, Figs. 3 and 4, the lower end 95 of the lever 93 having a slotted connection with the joint of the toggle at 98 as illustrated in Fig. 3. The toggle member 99 is connected at 100, Fig. 3, to the end of a lever 101 mounted for pivotal movement at 50 and carries an adjustable pin 102 adapted, when the lever 101 is moved downwardly by straightening the toggle, to engage the end of a finger 103 projecting from the clutch shifting arm 49, the construction being such that should the emergency lever 86, Figs. 3 and 4, be turned to the right, Fig. 4, the lever 93 will be rocked to cause the lower end 95 thereof to straighten the toggle and disengage the clutch member 46 from the clutch 40, thereby stopping rotative movement of the hub 70 and the cams carried thereby and consequently suspending the operative movements of the table and jacks mounted thereon. Shifting movement of the emergency lever 86 has additional functions with respect to the movement of the tools from operative position when the emergency lever is actuated with jacked shoes in position for treatment by the tools and this characteristic of the invention will later appear.

Figure 5:
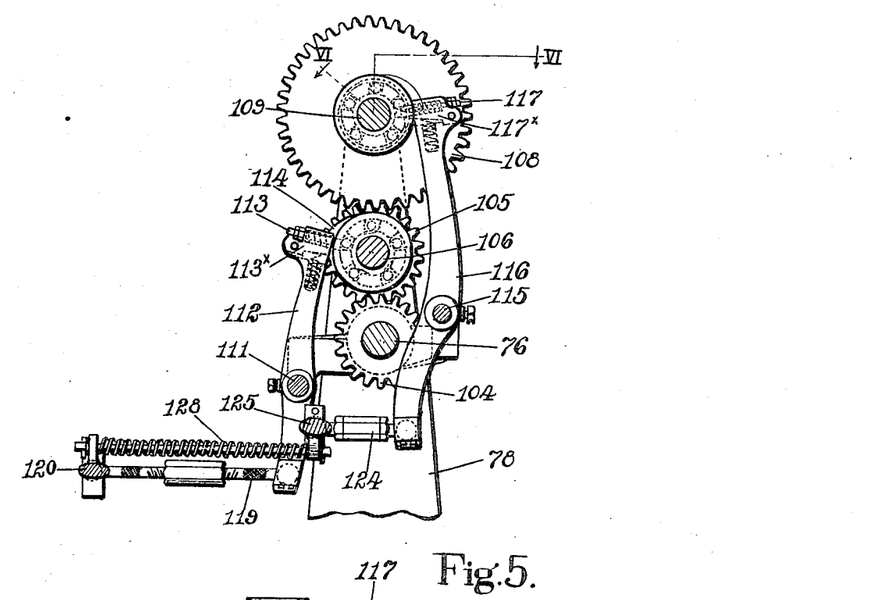
Fig. 5 is a vertical section on the line 5—5 of Fig. 4.
Figure 6:
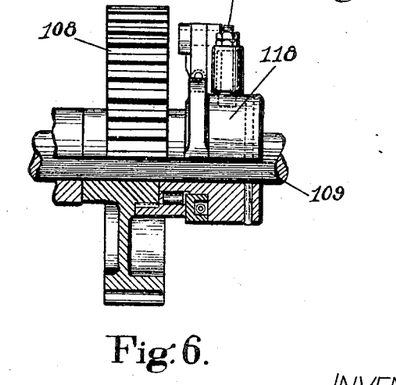
Fig. 6 is a section, enlarged, on the line 6—6 of Fig. 5.

The shaft 76, Figs. 2 and 4, has secured thereto a pinion 104 which is operatively engaged with a pinion 105, Figs. 4 and 5, loosely mounted on the shaft 106 appropriately journaled in bearings 107 sustained by the uprights or risers 77, 78, Fig. 4. The pinion 105 meshes with a gear or pinion 108, Figs. 4, 5 and 6, loosely mounted on the shaft 109 appropriately supported in bearings 110 sustained by the risers 77, 78 as indicated in Fig. 4. The pinions or gears 105, 108 are adapted to be operatively connected to their respective shafts under control of the cams 72, 73 heretofore described as rotatable with the worm 67.

In the illustrated machine the hub portions of the gears or pinions 105, 108 are adapted to be clutched to their respective shafts under the control of Horton clutches but, of course, other forms of clutches might be employed. Pivotally mounted at 111, Figs. 4 and 5, is a lever 112 having an upwardly spring impelled member 113ˣ adapted to engage the shoulder 114 connected with the usual roll carrier or cage of a Horton clutch. Similarly there is pivoted at 115, Fig. 5, a lever 116 having a similarly supported spring member 117ˣ adapted to engage with a shoulder 118 connected to the cage of the usual Horton clutch, the construction being such that should either of the members 113ˣ or 117ˣ engage with its respective shoulder of the associated Horton clutch, such clutch will be rendered ineffective and the gear or pinion with which it is associated will be operatively disconnected from its shaft. The pins 113 and 117 carried by the members 113ˣ and 117ˣ may hold their respective shafts from rotation when in stopped position by entering suitable holes in the usual cam part of the clutches.

The lower end portion of the lever 112 is connected by an adjustable rod 119 with a lever 120, Fig. 5, pivoted at 121, Fig. 2, and having an arm 122 carrying a roller 123 adapted to bear upon the peripheral portion of the cam 73. Similarly the lower end of the arm 116, Fig. 5, is connected by an adjustable rod 124, with an arm 125 pivoted at 126 (Fig. 2) and having an arm 127, the end of which carries a roller bearing against the peripheral portion of the cam 72. Between the arms 120 and 125, Fig. 5, is interposed a spring 128, for normally pressing the free ends of the arms 120 and 125 away from each other and, perforce, the other ends of the arms carrying the rolls against their respective cams, the construction being such that under the dictates of the cams 72 and 73 the Horton clutches heretofore described will be appropriately operated to connect their respective gears or pinions 108 or 105 to the shafts 109 and 106 respectively. The pinions 105 and 108 are continuously driven by gear 104 when the table and jack operating clutch is closed, and the shaft 106 or the shaft 109 will be operated whenever its associated clutch is operatively connected to it.

The shaft 106 has secured thereto a worm 129 which is engaged with a worm wheel 130, Fig. 4, secured to the table spindle or shaft 65, the construction being such that when the gear or pinion 105 is secured to its shaft as hereinbefore described, the table will be appropriately rotated.

The shaft 109 has secured thereto a worm 131, Fig. 4, which is engaged with a worm wheel 132 secured to a sleeve 133, loosely mounted upon the table spindle or shaft 65 and supported vertically thereon by means of a collar 134. The upper end of the table spindle or shaft 65 and the sleeve 133 find suitable bearing 135 in the upper portion of the cross frame 136. Secured to the upper end of the sleeve 133, is a jack controlling cam 137.

The table or carrier for carrying the shoe supports or jacks, of which there may be any suitable number arranged in a circular series, may be variously contrived and secured to the table spindle or shaft 65, but in the present instance of the invention the table comprises four arms 138 (Figs. 4, 7 and 9) each of which carries a shoe support or jack. The space between the arms 138 may be appropriately covered as by suitable plates (not shown) thereby to prevent chips and other foreign matter from dropping into the working parts of the machine beneath.

Figures 7, 8:
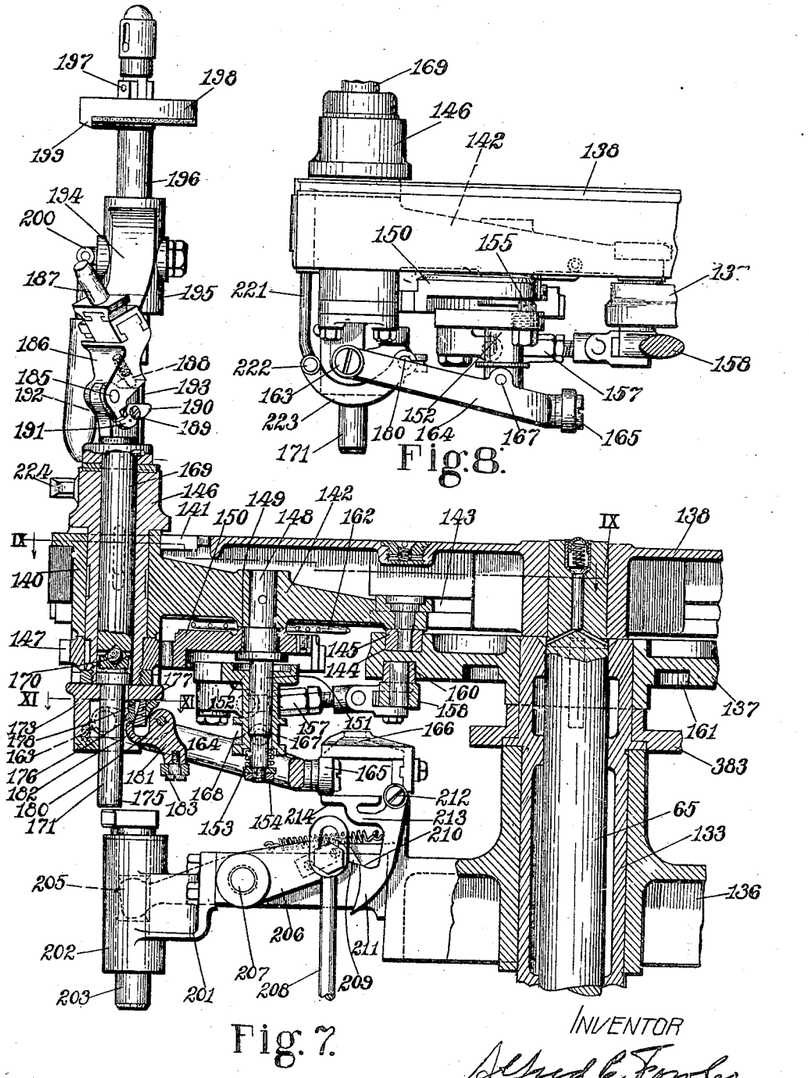
Fig. 7 is a vertical section through the revolving turret and one of the work supports at the jacking station.
Fig. 8 is a detail in side elevation showing parts of the jack-controlling devices at this same station.
Figures 9, 10, 11:
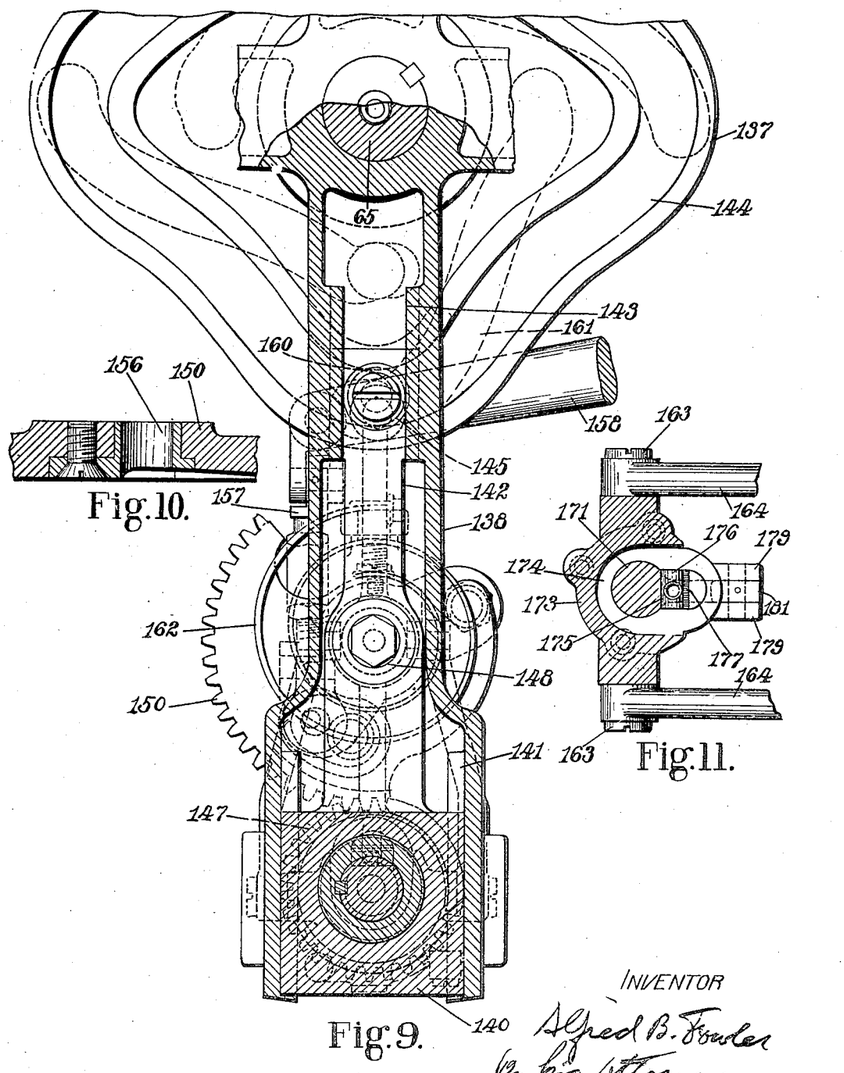
Fig. 9 is an enlarged horizontal section on the line 9—9 of Fig. 7.
Fig. 10 is an enlarged sectional detail on the curved line 10—10 of Fig. 9.
Fig. 11 is a section on the line 11—11 of Figs. 7 and 12.

Mounted in each of the arms 138 is a jack slide block 140, Figs. 7 and 9, such block 140 being mounted for sliding movement on its arm 138 in suitable ways or guides 141. Extending inwardly from each of the blocks 140 is an arm 142, the inner end of which has sliding engagement with a guide 143, Figs. 7 and 9, the construction being such that as the slide block 140 and arm 142 are moved radially of the table or arms 138 they will be suitably guided.

The jack controlling cam 137, Figs. 4 and 7, which, as hereinbefore described as secured to the sleeve 133, is provided with two cam surfaces or grooves, one for controlling the inward and outward movement of the jacks relative to the table and the other of which is devised for controlling the rotative movement of the jacks and shoes thereon during the operation of the tool or tools upon the heel, the two cams acting conjointly during the heel treating operation by one of the tools to traverse the heels past the tool at appropriately varying speeds so that the tool shall treat equal extents of surface of the heel during each successive unit of time.

To effect the inward and outward movement of the jacks the cam 137 is provided with an upper cam groove 144, Figs. 7 and 9, which is engaged by a roll or pin 145 extending from the arm 142 on the slide block.

Mounted for rotative movement in the slide block 140 is the jack support 146, Fig. 7, to which is secured or splined a pinion 147, through the medium of which the jack to be hereinafter described is appropriately rotated. Mounted in the arm 142 of the slide block is a pin or support 148, Fig. 7, provided with a collar 149 between which and the arm 142 is a toothed segment 150, the teeth of which engage the teeth of the pinion 147. When the jacket shoe is operatively positioned relative to a tool, the present invention contemplates movement of the jack to move the presented shoe past the tool at angular speeds varying in inverse ratio to the distance of the part being treated from the centre about which the shoe is moved to cause the tool to act in each successive unit of time on a like extent of contour surface for treatment. But when the treated shoe reaches jacking position it is desirable that the jack shall be freed from its rotating means in order that the attendant may properly accommodate the shoe to the jack.

To these ends the pin 148 extends below the collar 149 at 151, Fig. 7, and is provided with a sleeve 152, a spring 153 being interposed between the sleeve 152 and a stop or nut 154, the construction being such that the spring 153 normally tends to lift the sleeve 152 on the extension 151 of the pin 148. The sleeve 152 at its upper portion is provided with a locking pin 155, Fig. 8, which is adapted to engage a recess 156, Fig. 10, formed in the toothed segment 150 and, perforce, lock the toothed segment to the sleeve 152, when the two are brought into registering relation.

The sleeve 152 is connected by a link 157, Fig. 7, with an arm 158 pivotally mounted at 159, Fig. 1, to a lug extended from the table arms 138. Each of the arms 158, of which there is one for each jack, has a roll 160, Figs. 7 and 9, adapted to engage appropriate cam tracks or grooves 161 formed in the under surface of the cam 137, the construction being such that when the cam and table are relatively moved and the sleeve 152 is locked to the segment 150, a condition which exists when the jack is in operative relation with the tool, the jack is suitably rotated as hereinbefore described at angular speeds varying in inverse ratio to the distance of the part being treated from the centre about which the shoe is moved to cause the tool to act in each successive unit of time on an equal extent of the shoe.

When the jack carrying a shoe, the heel of which has been treated by the tool, reaches jacking position at the front of the machine as indicated at A, Fig. 1, it is desirable that the jack be released from its rotating means and be moved to a convenient position for the removal of the treated shoe and reception of a shoe to be treated. To this end a spring 162, Figs. 7 and 9, is connected to the toothed segment 150 so that when free to respond to the spring, the toothed segment may be rotated to turn the jack into an appropriate position for the removal of a jacked shoe and the reception of a shoe to be jacked.

Figure 13:
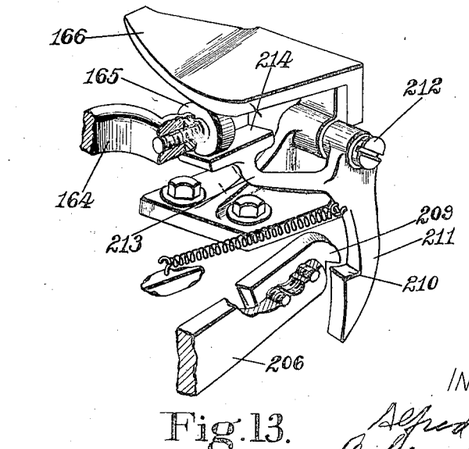
Fig. 13 is a detached detail in perspective showing the latch for locking the jacking treadle when the jack is not in jacking position and showing its release by the presence of a jack in jacking position.

Pivotally mounted at 163 are the arms 164, Figs. 7 and 11, of a bifurcated lever carrying at its end a roll 165, Fig. 7, adapted, as the jacked shoe approaches jacking position as indicated at A, Fig. 1, to engage the inclined surface of a cam 166, Figs. 7 and 13, the effect being that as the jack approaches jacking position the roll 165 on the bifurcated lever will be depressed. The arms 164 of the bifurcated lever, as indicated in Fig. 7, are each provided with a pin or roller 167 which engages a circular recess 168 in the sleeve 152, the construction being such that when the jack is approaching jacking position the end of the bifurcated lever will be depressed and the locking pin 155 carried by the sleeve 152 will be withdrawn from the recess 156 in the toothed segment 150, whereupon the spring 162 will turn the jack into an appropriate position for convenient removal and reception of shoes and even though the cam 137 be thereafter rotated during the jacking operation, the jack will not partake of the rotary movement and may be conveniently manipulated by the attendant.

Figure 12:
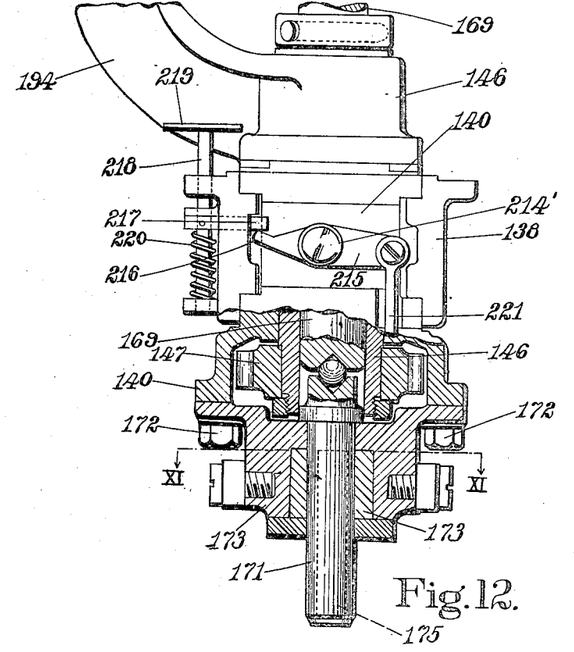
Fig. 12 is a front elevation on an enlarged scale, looking in the direction of the arrow in Fig. 9, showing certain portions of the jacking and jack-releasing mechanism, parts being broken away and in section.

Mounted for vertical movement in the jack block 146 is the jack spindle 169, Fig. 7, the lower end portion of which rests upon a ball bearing 170 interposed between the spindle 169 and a jacking plunger 171, the whole constituting a series of connections extending downward below the table, the construction being such that upon upward movement of the plunger 171 the jack spindle 169 will be raised. In order to hold the jack spindle in its raised or jacked position the present invention contemplates means permitting such upward movement of the jack spindle and for holding it in jacked position. To this end the jack slide block 140 has connected thereto by bolts 172, Fig. 12, a depending cap piece 173 in which is mounted the hardened steel block 174 through which passes the jacking plunger 171. The jacking plunger 171 has a flattened face as at 175, Figs. 11 and 12, adapted to be engaged by a locking roller 176, Figs. 7 and 11, which acts as a one-way automatic pressure-retaining clutch as it rides along the inclined surface 177 of the block 174, and under the impulse of a spring seats itself at the contracted portion of the space between the block and the flattened face 175 of the plunger to maintain the latter and, perforce, the jack spindle, in the raised or jacked position.

When a jack with a treated shoe thereon approaches jacking position as indicated at A, Fig. 1, it is not only desirable to have the jack free for attendant control rotatably as hereinbefore described, but the shoe should be unjacked. To this end the present invention contemplates the provision of means automatically for unjacking the shoe as the jack approaches jacking position. The steel block 174, Fig. 11, heretofore described as contained within the cap piece 173, has lugs 179 projecting therefrom in which is mounted a pin 180, Figs. 7 and 11. Secured to the pin 180 is a rocking lever 181, Fig. 7, having a catch-releasing toe portion 182, adapted to engage beneath the locking roller 176 to lift the same and allow the jacking plunger and jacking spindle to drop down. Mounted on the rocking lever 181 is a roller 183, Fig. 7, which as the jack approaches the jacking station as indicated at A, Fig. 1, with a jacked shoe thereon, is adapted to engage a cam 184, Fig. 1, secured to the frame of the machine in the path of movement of the roll 183 the construction being such that as the jack approaches the jacking station the lever 181 will be actuated to unlock the jacking plunger 171 and permit the jack spindle 169 to drop, being thus guided by the jack support 146 to bring the series of connections by which the jacks are actuated to a normal position.

When the jacked shoe reaches the jacking station it should not only be unjacked for convenient removal but should be placed in convenient position for such removal and the jack parts arranged for convenient reception of another shoe. Pivotally mounted at 185, Figs. 1 and 7, is the jack block 186 carrying the last pin 187. A spring plunger 188 in the jack block 186 is so arranged that when the jack block is free, it will be swung into the position indicated in Fig. 7, under the impulse of the spring back of said plunger 188. It is desirable, however, that when the jack block is turned into vertical position for jacking the shoe it should be held in such position and then released when the jacking plunger is unlocked to permit drop of the jack. Mounted on the head of the jack spindle 169 at 189, Fig. 7, is a locking catch 190, the end 191 of which is adapted to engage a shoulder 192 on the jack block 186 when the latter is turned into vertical position and a spring normally tends to throw the locking catch 190 into locking position. As the jack approaches the discharge and here the jacking position, the jacking spindle 169 drops to unjack the shoe and in order to automatically unlock the jack block 186 at such time to permit the shoe to be swung outwardly for convenient removal, there is mounted upon the jack support 146, Figs. 1 and 7, a stop or trip 193 which, as the jack spindle drops during the unjacking operation, hits the end of the latch 190 and unlocks the jack block 186 thereby permitting the spring plunger 188 to throw the block into its inclined outward position, as indicated in Fig. 7.

Where the heels of shoes are to be treated about the contour surface thereof, it is desirable that the shoe be jacked with the rand crease in a predetermined vertical position or that the jacking movement of the shoe be to a fixed point determined by the thread of the heel. Extending laterally from the jack support 146 is the arm 194, Figs. 1 and 7, having a sleeve 195 in which is adjustably mounted an arm 196 turned to overhang and serve as a stop for the shoe bottom, as indicated in Fig. 1, and having pivotally mounted thereon as at 197 (Fig. 7) a toplift plate 198, the shoulder 199 of which is adapted to engage the breast of the heel mounted on the jack when the shoe is in jacked position. Automatic adjustment of the last pin 187 to permit proper positioning of the shoe with the breast of the heel in engagement with the shoulder 199 is permitted by the dovetail sliding connections at right angles to one another between said pin 187 and the jack post 186 shown in Fig. 7. By means of the sleeve 195 and the clamp 200, Figs. 1 and 7, the toplift plate and, perforce, the position of the tread of the heel and rand crease may be predetermined for different heights of heels.

Secured to the machine frame, as indicated in Fig. 7, is a bracket 201 having a sleeve 202, Fig. 1. in which is a plunger 203 having a head 204 adapted to engage the lower end of the jacking plunger 171 when the jack is in jacking position. The plunger 203 has a suitable recess to engage the head 205 of a jacking lever 206, Fig. 7, pivotally mounted at 207 on the machine frame and connected by the rod 208, Fig. 1, with the jacking treadle 57 hereinbefore described, the construction being such that by depression of the jacking treadle 57 a powerful pressure of substantially any degree within a range may be applied to the jacking plunger 171 and a shoe mounted upon a jack in jacking position may be suitably jacked.

As hereinbefore described the act of jacking a shoe at the jacking station and the release of the jacking means or treadle 57 acts to start the machine into operation, and when a shoe has been transferred from the jacking station to a tool and has been treated by such tool, the machine automatically comes to a rest by movement of the projection 82 of the lever 54 upwardly into the recess 81 of the cam 74, Fig. 3. At this time the catch 61 on the arm 60 is disengaged from the lug 62, having been so disengaged by the pin 83 as before described, consequently the clutch members 40 and 46 being now out of engagement, the table movement as well as the movement of the jacks relative to the tools as they treat the contour surfaces of the heels, will be suspended until after the jacking operation is again performed and the jacking means or treadle 57 has been released. This is desirable because until a shoe is properly jacked at the jacking station it cannot be properly presented to the tool or tools, and if the jack at the jacking station were moved from jacking position by the table before a shoe is properly jacked, the jack would be moved away from the jacking instrumentalities and subsequent jacking of the shoe would be impossible. Consequently the initiation of table and jack movement to carry the jacked shoes to the tools and for moving them relative to the tools during the tool operations, are made dependent upon the operation and completion of the jacking means thereby to insure that before these operations are inaugurated a shoe to be treated will have been properly jacked.

It will therefore be apparent that after a shoe has been jacked and the machine has been started to carry the jacked shoe by movement of the table from jacking position to the tool for treating the shoe, it is important to prevent further manipulation of the jacking means until another jack has reached the jacking station and the shoes presented to the tools shall have been treated. The jacking lever 206, Figs. 7 and 13, is provided with a catch or toe 209 which is adapted to engage the shoulder 210 of a latch 211 pivotally mounted at 212, as best indicated in Figs. 7 and 13, and normally under the influence of a spring tending to place the shoulder in position beneath the toe 209. The latch 211 is also provided with an arm 213 having an end portion 214 adapted, as a jack approaches a jacking station, to be engaged by the roller 165 which moves with the jack thereby to swing the latch 211 from locking engagement with the jacking lever 206 and free the jacking mechanism for the jacking operation.

After a shoe has been jacked and before the jacking treadle is released, the attendant may find it desirable again to release the shoe so as to correct its jacked position. To this end the jack slide block 140 has pivotally mounted thereon at 214', Fig. 12, a lever 215 having a toe portion 216 underlying a ledge 217 carried by a manually operable pin or plunger 218, the head 219 of which may be engaged by the attendant to depress said pin or plunger against the stress of a spring 220 thereby to rock the lever 215 to release the shoe. Connected to the lever 215 is a rod 221, Fig. 12, which, as indicated in Fig. 8, is pivotally attached at 222 to a curved lever 223 secured to the rocking pin 180 carrying the unjacking rocking lever 181, Fig. 7, the construction being such that after the jack lever 206 has been actuated to lift the jack and the latter is locked in its lifted position by the roller 176, as hereinbefore explained, the attendant may, by letting up slightly on the jacking treadle but without releasing it entirely, cause the jacking spindle 169 to drop part way by manipulation of the pin or plunger 218, thereby enabling him to correct the position of the shoe on the jack and thereafter to complete the jacking operation.

When the jack is in jacking position as hereinbefore explained, the toothed segment 150 is operatively disengaged from the actuating sleeve 152 and pin 155 (Fig. 8) so that the jack may be manipulated by the attendant in jacking the shoe. As the jacked shoe however approaches the first tool for treatment after being jacked, it is desirable to have the tool commence its action and that the jack be placed under control of its rotating means and to this end the jack support 146 is provided with a lug 224, Figs. 1 and 7, which, as the jack approaches the first tool of the series, is adapted to engage a yielding stop 225 (Fig. 1) comprising a plunger 226 under the yielding influence of a spring (not shown), the construction being such that as the table carries the jacked shoe from the jacking station at A, Fig. 1, to the first of the series of tools for treatment, the lug 224 of the jack will engage the yielding stop 225 and the jack will be turned against the tension of its spring 162, Fig. 7, to bring the opening 156 in the toothed segment 150, Fig. 10, into register with the pin 155 carried by the sleeve 152 as hereinbefore described, thereby placing the jack automatically under the control of its rotating means.

The emergency lever 86 is also arranged to withdraw the tools from engagement with the work when it becomes necessary arbitrarily to interrupt operation of the machine, and to this end it is connected by a lost motion connection through an arm 234 and a link 235 (Fig. 4) to a vertical shaft 236 mounted in suitable bearings 238 provided in the machine frame. At the upper end of the shaft 236 is an arm 244 (Fig. 4) which is connected to a rod 246 (Fig. 1) arranged to withdraw the tool-supporting slide 26 against the action of a weight 250. Similar connections are provided to each tool slide. At the lower end of this shaft 236 an arm 242 is provided with a roller which travels along the cam 71 (Fig. 2) which is secured on the hub 70 surrounding the table shaft 65. Thus the tools are also automatically withdrawn from the work at the completion of each cycle or rotation of the hub 70.

In the form of the invention herein described, the heels to be treated are secured to the shoe, but the invention in its more comprehensive aspect and with relation to some of the features thereof may advantageously be employed in the treatment of other parts of the shoe when the contour to be followed or treated changes as the tool progresses along the shoe, and likewise heels of shoes may be treated before they are secured to the shoe.

In the use of the machine, the shoes to be treated should be presented to the tools with the rand creases in approximately predetermined position. If the shoes are without lasts, their positions can be adjusted by varying the height of the jack posts or that part of the jack which goes inside the shoe, the movable clamping member acting upon the toplift in this case. In the illustrated embodiment of the invention, the machine is shown for the treatment of shoes having lasts in them, and as lasts vary in height at the heel portion, it is desirable to locate the rand crease, as hereinbefore stated, from a fixed position of the toplift.

After a shoe has thus been jacked by proper manipulation of the combined starting and jacking treadle 57, the release of said treadle will, as will be recalled, connect the intermediate shaft 35 to the carrier and the jack-actuating mechanism and cause the machine to complete a single cycle. During this cycle, the carrier will be rotated through ninety degrees to bring each piece of work to a new station, the tools will automatically be brought into operative relation to the pieces of work, and each of the jacks will be given a combined sliding and rotatory movement by means of which various portions of the surface of the work will be brought into engagement with the particular tool with which it is associated.

Since in the illustrated embodiment of the invention the carrier is in the form of an endless carrier, here a rotatable table, the movement of said carrier, to transfer the jacked piece of work to the first operating station, is also effective to transfer a completed piece of work to the discharge station, which here coincides with the jacking station. As the completed work approaches this position, the jacking plunger will be released under the action of the cam 184 and, as the plunger drops, unclamping the shoe, the last-supporting section 186 at the upper end of said plunger will be tilted forward under the action of spring 188 to facilitate the removal of the completed work and its replacement by another shoe. Full opportunity is given for this removal and replacement because of the necessity for depressing and releasing the treadle 57 before the machine will again start upon a cycle of operations.

Having thus described my invention, what I claim as new and desire to secure by Letters Patent of the United States is:—

1. In a machine of the class described, a movable carrier having a shoe support, operator controlled mechanism for jacking a shoe upon a shoe support in one position of the carrier and means for controlling the movement of the carrier arranged to be controlled by said operator-controlled jacking mechanism.

2. In a machine of the class described, a movable carrier having a plurality of shoe supports, operator-controlled mechanism for jacking a shoe upon that one of the supports which is adjacent to the operator, and means for starting and controlling the movement of the carrier arranged to be operated by said operator-controlled jacking mechanism.

3. In a machine of the class described, the combination of a carrier having a shoe support, means for jacking a shoe on the support when in a predetermined position, and means controlled through the jacking means for starting the carrier to transfer a jacked shoe from jacking to shoe treating position, means for then freeing the carrier from the jacking means, and means acting to continue the carrier movement after it has been freed from control of the jacking means.

4. In a machine of the class described, the combination of a carrier having a shoe support, means for jacking a shoe on said support when in a predetermined position, means for moving the carrier to transfer a jacked shoe from jacking to shoe treating position, means controlled from the jacking means to render the carrier moving means effective, a trip to free the carrier moving means from control of the jacking means, and means for continuing the carrier moving means effective when it is freed from control of the jacking means.

5. In a machine for manufacturing boots and shoes, the combination of a carrier having shoe supports, means for jacking a shoe on one of said supports when it is in a predetermined position, means for locking the jacking means from operation when a shoe support is not in jacking position, and means controlled by the jacking means for starting the machine after a shoe has been jacked.

6. In a machine of the character described, the combination of a carrier, a shoe support carried thereby, jacking means for jacking a shoe on the shoe support, means for automatically unjacking a shoe as the jacked shoe is moved toward the jacking position, means rendered operative to move the carrier when the jacking means is released after a jacking operation, and means for locking the jacking means after its release to prevent actuation of the jacking means until a shoe support reaches jacking position.

7. A machine for operating upon shoes comprising, in combination, a rotary turret carrying a plurality of shoe holding devices, stopping and starting mechanism and a controlling treadle therefor, a latch to prevent operation of said treadle, and a plurality of tripping devices carried by the turret automatically to trip the latch and permit operation of the treadle when the turret is in any one of a series of predetermined positions.

8. A machine as defined by claim 5, in combination with mechanism for operating the shoe holding devices independently of the turret, and a cam for freeing from said mechanism the one of said holding devices that is next the operator at the time the latch is tripped to release the controlling treadle.

9. A shoe feeding device comprising, in combination, an endless carrier, a series of shoe engaging members carried thereby, a corresponding series of members to clamp shoes thereagainst, a series of plungers sliding through the carrier to operate said clamp members, and a single treadle-operated member to push the plungers successively to clamp a plurality of shoes as the carrier brings the plungers successively into position to be operated thereby.

10. A shoe feeding device comprising, in combination, a rotary turret, a series of shoe engaging members carried thereby, a corresponding series of members to clamp shoes thereagainst, a series of plungers sliding through the turret to operate said clamp members, a one-way catch to engage each plunger to hold it in clamping position, catch-releasing means, and a single treadle-operated member to push the plungers successively to clamp any one of a plurality of shoes as the turret brings the plungers successively into position to be operated thereby.

11. A machine of the class described comprising, in combination, a stop to engage the bottom of a shoe, a plunger to engage a last in a shoe to clamp the shoe against the stop, an operator-controlled treadle-operated lever to push against the plunger, and a one-way clutch device to hold the plunger.

12. In a machine of the character described, the combination of a table, a shoe support carried by the table, means for rotating the table and independently rotating the shoe support, a jacking spindle carried by the table for jacking a shoe on the shoe support, a jacking plunger adapted to be operatively related to the jacking spindle when the shoe support is in jacking position, and means for locking the jacking spindle when it has been raised to jack a shoe on the shoe support.

13. In a machine of the character described, the combination of a table, a shoe support carried by the table, means for rotating the table and independently rotating the shoe support, a jacking spindle carried by the table for jacking a shoe on the shoe support, a jacking plunger operatively related to the jacking spindle when the shoe support is in jacking position, and a roller lock for locking the jacking spindle when it has been raised.

14. A shoe machine comprising a carrier, a series of shoe-supporting and clamping devices thereon, means for applying powerful pressure to the devices, and clutches adapted to hold the devices at any degree of pressure while transferred by the carrier from the point of pressure application to a point of release.

15. A shoe machine comprising an endless carrier, a series of shoe-supporting and heel-clamping devices thereon, means for applying powerful pressure to the clamped heel portion of a shoe in each device, and clutches adapted to hold the devices at any degree of pressure while transferred by the endless carrier from the point of pressure application past a plurality of stations back to said point.

16. A machine of the character described comprising a rotatable table, a circular series of shoe-supporting and heel-pressing devices thereon, means for applying powerful pressure to the devices, and clutches adapted to hold the devices at any degree of pressure while carried by the table from the point of pressure application to a point of release.

17. A machine of the character described, comprising a rotatable table, a circular series of shoe-supporting and heel-pressing devices thereon, a common pressure-producing means at one region, means whereby said devices are brought successively into operative relation to the pressure-producing means as the table is turned step by step, clutches associated with the several devices adapted to hold the same at any degree of pressure while carried by the table from a point of pressure application to a point of release, and means for releasing the clutches at the latter point.

18. A machine of the character described, comprising a rotatable table, a circular series of shoe-supporting and heel-pressing devices thereon, a treadle and a common operating connection located at one region, individual connections connected with the several devices adapted to co-operate successively with said common connection, and clutches adapted to hold the devices at any degree of pressure while carried by the table from the point of pressure application to a point of release.

19. A machine of the character described, comprising a rotatable table, a circular series of shoe-supporting and heel-pressing instrumentalities thereon, treadle means for applying pressure through said instrumentalities as the latter are brought into operative relation thereto by the step-by-step turning of the table, means for automatically arresting the table at its several operating positions, and clutches for automatically holding the instrumentalities under any degree of pressure.

20. A machine of the character described, comprising a rotatable table, a circular series of shoe-supporting and heel-pressing instrumentalities thereon, means for holding and releasing the same, a series of connections extending downward below the table for actuating said instrumentalities, a common treadle and actuating connection adapted to co-operate successively with the members of said series of connections, means for guiding the members of said series of connections to normal positions, and a spring urging the treadle and common connection to a normal position for co-operating with the series of connections.

21. A machine of the character described, comprising a rotatable table, a circular series of shoe mounts thereon, a corresponding series of heel-engaging members carried by the table above the shoe mounts, common means at one region for imparting relative movement to each co-operating shoe mount and heel-engaging member to clamp a heel and shoe when brought into operative relation to said means by the turning of the table, and clutches adapted to hold said mounts and members at any degree of pressure while carried by the table from the point of pressure application to a point of release.

22. A machine of the character described, comprising a rotatable table, a circular series of shoe mounts thereon, a corresponding series of heel-engaging members, treadle means for separately actuating said mounts and members, and means for automatically holding shoes and heels clamped therebetween at substantially any degree of pressure within a range.

23. A conveying mechanism for shoes, comprising, in combination, an intermittently rotatable turret, a plurality of shoe clamping devices carried by the turret, each of said devices comprising a member to engage the tread surface of a heel and a member to apply clamping pressure to a shoe in opposition thereto, and a single treadle operated device for relatively actuating said members successively to clamp shoes as they are brought into co-operative relation to said device by the movement of the turret.

24. A shoe support comprising, in combination, a member to engage a heel on a shoe, and a second member for insertion in a shoe to co-operate therewith in clamping the heel and shoe, a sliding plunger carrying one of said members, and a one-way clutch device engaging said plunger to hold a heel and shoe in clamped position.

25. A support for a heel and shoe comprising, in combination, a plate to engage a heel on a shoe, and a device for insertion in a shoe to clamp the shoe and the heel against said plate, said device including a sliding plunger and a clutch device to hold the plunger in any position of adjustment.

26. A support for a heel and shoe comprising, in combination, a plate to engage a heel on a shoe, a member for insertion in a shoe to hold the shoe and heel clamped thereagainst, a movable device for relatively actuating said members to clamp a heel and shoe, a one-way clutch to hold said device in clamping position, and means to trip said clutch.

27. In a shoe machine, the combination of an endless carrier, a plurality of shoe supports mounted on said carrier, means for moving the carrier, jacking spindles on the carrier for jacking shoes on the shoe supports, a jacking plunger operatively related to that one of the jacking spindles associated with the shoe support which is in jacking position, and means acting automatically to unjack the shoe as it is returned toward the jacking plunger.

28. In a machine for operating upon shoes, a work support movable toward and away from the operator and movable in a substantially vertical direction, means for clamping said work support in any position of vertical adjustment to which it may be moved, and means constructed and arranged automatically to release said clamping means when the work support is in position for removal and replacement of the piece of work by the operator.

29. In a machine of the character described, the combination of a table, a shoe support carried by the table, means for rotating the table and independently rotating the shoe support, a jacking spindle carried by the table for jacking a shoe on the shoe support, a jacking plunger operatively related to the jacking spindle when the shoe support is in jacking position, and means acting automatically to unjack the shoe as it is moved towards the jacking plunger.

30. In a machine for manufacturing shoes, the combination of a shoe support, means for jacking a shoe on said support, means for transferring the support with a jacked shoe thereon from jacking to a shoe treating position, and means independent of the jacking means for unjacking the shoe at will at any position of the shoe support.

31. In a machine for treating shoes, the combination of a table or carrier having a jack mounted thereon, means for moving the table or carrier to transfer a shoe from a jacking position to operative relation with a tool for treatment, and means operable at will for unjacking the shoe at any point of transfer from the jacking to the tool treating positions.

32. In a machine of the character described, the combination of a table or carrier having a shoe support thereon, means operable at a fixed position for jacking a shoe on said support, means for moving the table or carrier to transfer a support from jacking position to a shoe treating position, and means operable at will at any point between the jacking position and shoe treating position for unjacking the shoe.

33. In a machine of the character described, the combination of a table, a shoe support carried by the table, means for rotating the table and independently rotating the shoe support, a jacking spindle carried by the table for jacking a shoe on the shoe support, a jacking plunger operatively related to the jacking spindle when the shoe support is in jacking position, means for locking the jacking spindle when it has been raised to jack a shoe on the shoe support, and manual means for tripping the locking means at will.

34. A shoe support comprising, in combination, a shoe holding member, a sliding plunger to move said member to and from operative position, and means automatically to tilt said member relatively to the plunger when it is moved to inoperative position to provide for convenient removal of the shoe.

35. In a machine of the character described, a conveyor, a plurality of shoe supports on said conveyor each comprising an abutment and a coacting sliding plunger, means for locking said plunger in position to clamp a shoe mounted on said support, said plunger being provided with a hinged portion adapted to tilt to facilitate the easy removal of work therefrom, means for holding the hinged portion in operative position, and means for releasing the plunger lock and holding means for the hinged portion.

36. In a shoe-treating machine, a shoe support comprising a vertical plunger provided with a hinged section adapted to tilt to facilitate the easy removal of work therefrom, means for locking said plunger in operative position, means for holding said hinged portion in operative position, and means controlled by the position of the plunger for releasing the latter holding means.

37. In a shoe-treating machine, a shoe support comprising an upright plunger provided with a hinged section adapted to tilt outwardly to facilitate the easy removal of work therefrom, means for locking the hinged section in operative position, means for locking the plunger in operative position, and means for releasing said locks in the desired sequence.

38. In a shoe-treating machine, a shoe support comprising an upright plunger provided with a hinged upper section, resilient means for tilting said hinged section out of alinement with the plunger to facilitate the removal of work therefrom, means for locking said hinged section in alinement with the plunger, and means dependent upon the operative position of the plunger controlling the release of said locking means.

39. In a shoe-treating machine a conveyor provided with a plurality of shoe supports which comprises a fixed abutment and an upright co-operating plunger provided with a hinged upper section, means for latching said hinged section in alinement with the plunger, means for retaining said plunger in operative work-clamping relation, and means occupying a predetermined relation with respect to said conveyor arranged to release said plunger and disengage the latching means from the tiltable section of said plunger.

40. A support for a shoe and heel comprising, in combination, a member to engage the tread surface of a heel in a definite relation, a last pin for supporting a last in the shoe attached to the heel, a support for the last pin, and sliding connections at right angles to one another to permit the last pin automatically to adjust its position to permit said definite relation between the position of the heel and the position of the tread engaging member.

41. In a machine of the character described, the combination of a table carrying a series of shoe supports, a shaft carrying the table, means on the shaft for turning the table and operating the shoe support, cams mounted on the shaft for controlling the shaft turning and shoe support operating means, and means connected to the cams on the shaft for operating the cams.

In testimony whereof I have signed my name to this specification.

ALFRED B. FOWLER.